(12) United States Patent
Wylie

(10) Patent No.: US 9,282,752 B1
(45) Date of Patent: Mar. 15, 2016

(54) COLLAPSIBLE HITCH MOUNTED GAME HOIST APPARATUS

(71) Applicant: Justin R. Wylie, Akron, CO (US)

(72) Inventor: Justin R. Wylie, Akron, CO (US)

(*) Notice: Subject to any disclaimer, the term of this patent is extended or adjusted under 35 U.S.C. 154(b) by 0 days.

(21) Appl. No.: 14/885,003

(22) Filed: Oct. 16, 2015

(51) Int. Cl.
| A22B 5/16 | (2006.01) |
| B60P 1/54 | (2006.01) |
| A22B 5/06 | (2006.01) |

(52) U.S. Cl.
CPC . *A22B 5/161* (2013.01); *A22B 5/06* (2013.01); *B60P 1/5471* (2013.01)

(58) Field of Classification Search
CPC ......... A22C 17/00; A22C 17/04; A22C 17/02
USPC ......... 452/125, 127, 132, 133, 185, 187–192; 224/521–22, 519, 524–25, 528, 533, 224/310; 414/462
See application file for complete search history.

(56) References Cited

U.S. PATENT DOCUMENTS

| 6,202,868 B1* | 3/2001 | Murray | A22B 5/06 212/227 |
| 6,250,483 B1 | 6/2001 | Frommer | |
| 6,705,821 B2* | 3/2004 | Philipps | B60P 1/5471 212/180 |
| 6,921,007 B1* | 7/2005 | Guerrant | B60R 9/06 224/519 |
| 7,201,552 B1* | 4/2007 | Angel | A22B 5/06 212/180 |
| 7,374,388 B2 | 5/2008 | Holt | |
| 7,625,269 B2* | 12/2009 | Godwin | A22B 5/06 452/129 |
| 7,931,824 B2* | 4/2011 | Gin | C07D 233/64 252/299.01 |
| 8,210,912 B2* | 7/2012 | Ugiansky | A22B 5/06 452/187 |
| 8,777,703 B1* | 7/2014 | Herron | A22B 5/161 452/128 |

* cited by examiner

*Primary Examiner* — Richard Price, Jr.
(74) *Attorney, Agent, or Firm* — Crossley Patent Law

(57) ABSTRACT

A game hoist apparatus including a base unit attachable to the tow hitch of a vehicle, a boom and winch pulley system disposed on the base unit to attach and vertically lift a game animal for field processing. The apparatus has a swivel unit allowing the boom to rotate 360-degrees to access the game animal being processed and to load the animal into the vehicle for transport. The apparatus includes an attachable game skinning tool securable to a lower wall of a horizontal shaft of the base unit. The skinner tool has sharp skinner snatch pins to maintain one end of the animal's hide in a fixed position and to peel the hide from the animal is hoisted. The apparatus can be disassembled and collapsed into a small bundle for easy transport and storage.

4 Claims, 4 Drawing Sheets

COLLAPSIBLE HITCH MOUNTED GAME HOIST APPARATUS

BACKGROUND OF THE INVENTION

Various types of hitch mounted game hoists are known in the prior art. However, what is needed is a collapsible hitch mounted game hoist apparatus which is rotatable 360 degrees and is lockable at various degrees of rotation. The apparatus has an attachable skinning tool and is collapsible into a small bundle for easy transport and storage.

FIELD OF THE INVENTION

The present invention relates to hitch mounted game hoists, and more particularly, to a collapsible hitch mounted game hoist apparatus with an attachable skinning tool.

SUMMARY OF THE INVENTION

The general purpose of the present collapsible hitch mounted game hoist apparatus, described subsequently in greater detail, is to provide a hitch mounted game hoist which has novel features that result in a more complete and versatile hitch mounted hoist with more game processing options which is not anticipated, rendered obvious, suggested, or even implied by prior art, either alone or in combination thereof.

To accomplish this, the collapsible hitch mounted game hoist apparatus includes a swivel unit which allows the hoist to rotate 360 degrees for better access to all parts of the game being processed. The 360 degree rotation also allows for easy loading of the game into the back of a vehicle. In addition, the collapsible hitch mounted game hoist apparatus includes a base unit and an attachable game skinning tool, also referred to as a skinner bar, and is secured on the outermost part of the base unit. The skinner bar has sharp downward pointing skinner snatch pins which hold one end of the animal's hide in a fixed position and which peel the hide from the animal while being vertically hoisted with the winch. The collapsible hitch mounted game hoist apparatus is also structured in such a way that it can be disassembled and collapsed into a small bundle for easy transport and storage.

Thus, has been broadly outlined the more important features of the present so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 5 thereof, the collapsible hitch mounted game hoist apparatus employing the principles and concepts of the present collapsible hitch mounted game hoist apparatus and generally designated by the reference number 10 will be described.

Figure 2:
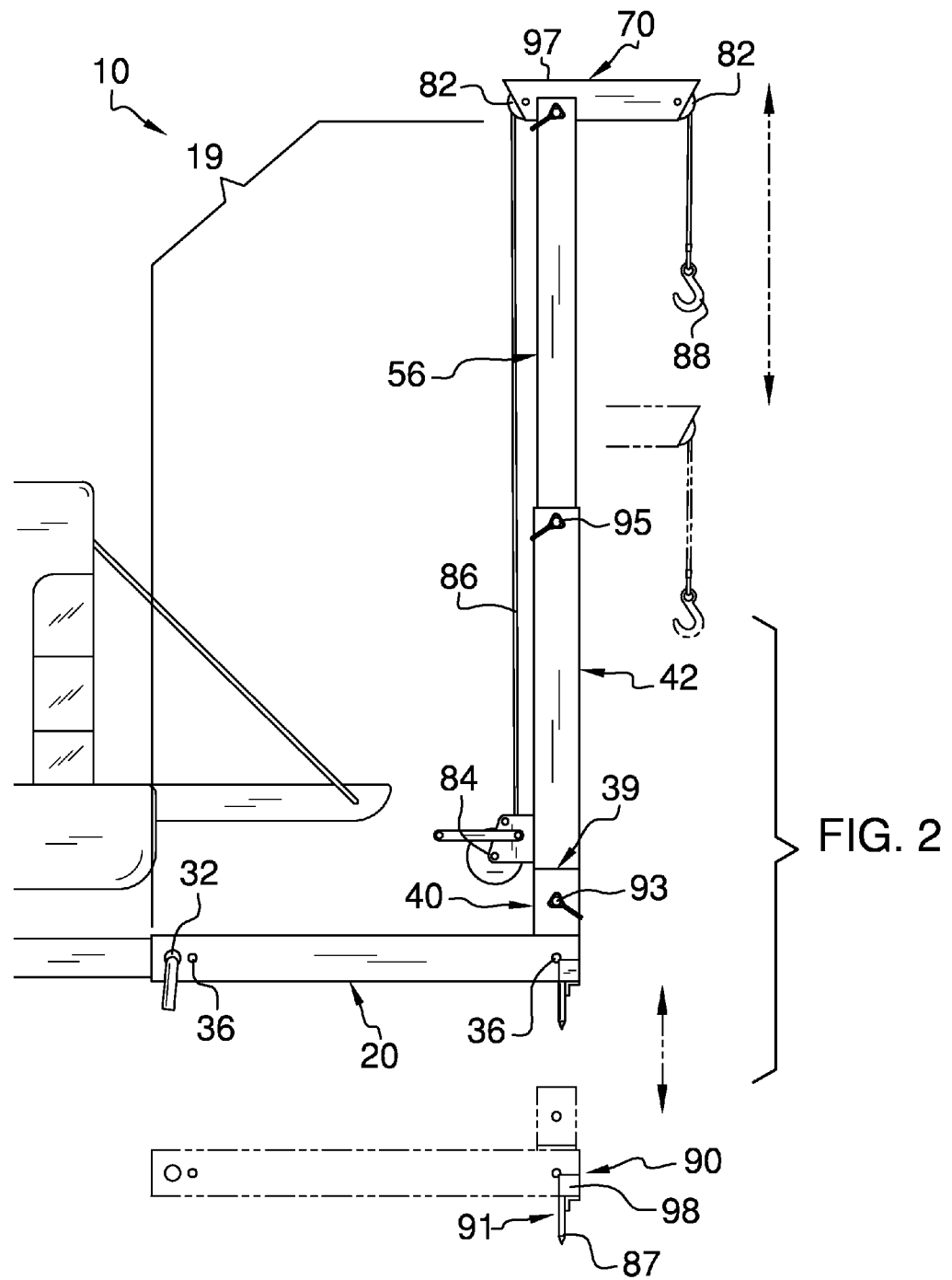
FIG. 2 is a side elevation view.
Figure 3:
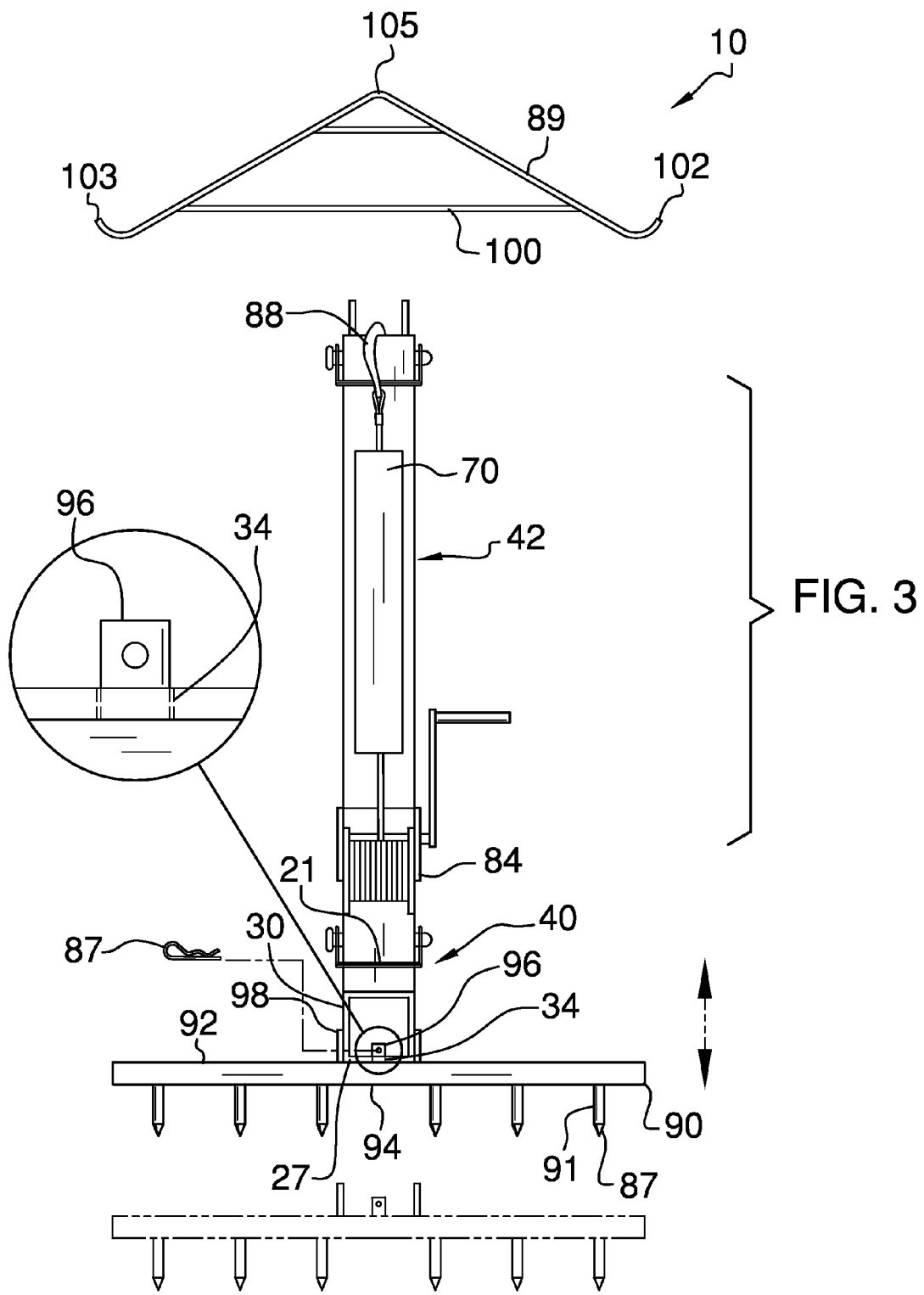
FIG. 3 is a rear elevation view.
Figure 4:
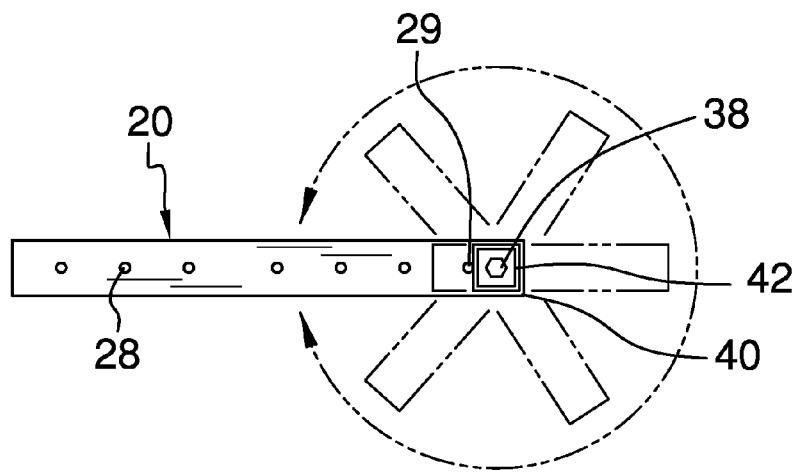
FIG. 4 is a top plan view of a base unit.

Referring to FIGS. 1 through 5 the present collapsible hitch mounted game hoist apparatus 10 devised to hoist and process game in the field is illustrated. The collapsible hitch mounted game hoist apparatus 10 includes an L-shaped frame 19. The L-shaped frame 19 includes a base unit 20, a swivel unit 40, a lower vertical boom shaft 42, and an upper vertical boom shaft 56. The base unit 20 has a hollow horizontal shaft 21. The horizontal shaft 21 has a rear end 22, a front end 24, an upper wall 26, and a lower wall 27 and a pair of side walls 30. A plurality of centrally aligned skinner bar storage holes 28 is continuously disposed along the upper wall 26. A swivel unit locking hole 29, shown in FIG. 4, is centrally disposed on the upper wall 26 proximal the rear end 22. A hitch mounting hole 32 is disposed in each of the side walls 30 proximal the front end 24 of the base unit 20. A storage pin alignment hole 36 is also disposed in each side wall 30 proximal each of the front end 24 and the rear end 22 of the base unit 20. A mounting nipple receiving aperture 34 centrally disposed on the lower wall 27 of the horizontal shaft 21 proximal the rear end 22.

A hollow parallelepiped swivel unit 40 is disposed on the rear end 22 on the upper wall 26 of the horizontal shaft 21 in a position perpendicular to the base unit 20. The swivel unit 40 has a quadrate of walls 37, an open top end 39, and a closed bottom end 41. A swivel bolt hole 43 is centrally disposed in the bottom end 41. A swivel bolt 38, shown in FIG. 4, attaches the swivel unit 40 to the rear end 22 upper wall 26 of the horizontal shaft 21.

A hollow parallelepiped lower vertical boom shaft 42 is swiveably disposed atop the swivel unit 40 in a position coplanar to the swivel unit 40. The lower vertical boom shaft 42 has an open lower end 44, an open top end 46, a front wall 49, a rear wall 50, a right wall 52, and a left wall 54. A hollow parallelepiped upper vertical boom shaft 56 is telescopically disposed within the lower vertical boom shaft 42. The upper vertical boom shaft 56 has an open lower end 58, an open upper end 59, a front wall 60, a rear wall 61, a right wall 62, and a left wall 64.

A top pulley unit 70 is disposed on the upper end 59 of the upper vertical boom shaft 56 in a position perpendicular thereto. The top pulley unit 70 has a hollow horizontal arm 71. The horizontal arm 71 has a rear end 72 and a front end 74, an upper wall 76, a lower wall 78 and a pair of side walls 80. A pulley 82 is disposed on each of the rear end 72 and the front end 74. Each pulley 82 has a pulley axle 79 mounted through each of the side walls 80. A winch 84 is disposed on the front wall 49 of the lower vertical boom shaft 42 proximal the lower end 44.

A cable 86 extends around the winch 84 and upwardly and over the pair of pulleys 82 along the lower vertical boom shaft 42, the upper vertical boom shaft 56, and through the top pulley unit 70 and terminates in a hook 88. A gambrel 89 engages the hook 88 such that the gambrel 89 hangs downwardly from the hook. The gambrel 89 has attached a pair of parallel cross bars 100, which adds structural strength for hoisting large game animals for field dressing.

Figure 1:
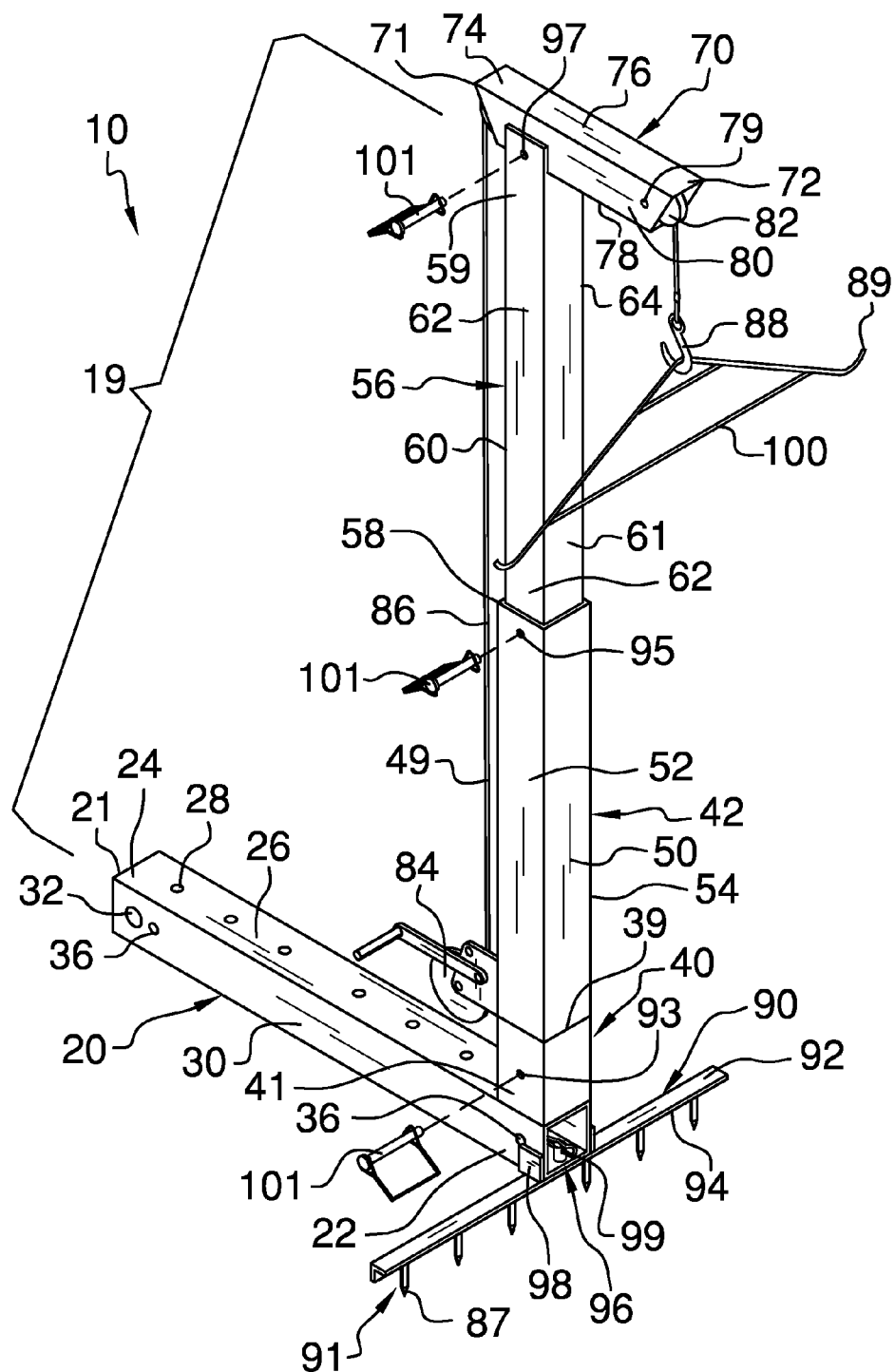
FIG. 1 is an isometric view.

A skinner bar 90 is provided to skin an animal. The skinner bar is attachable to the horizontal shaft 21 rear end 22. The skinner bar 90 has an upper surface 92 and an undersurface 94. A U-shaped stabilizer plate 98 is disposed on the upper surface 92 of the skinner bar 90 and directly adjacent to the side walls 30 of the horizontal shaft 21. The skinner bar 90 upper surface 92 has a centrally disposed mounting nipple 96. A mounting pin hole 99, shown best in FIGS. 1 and 3, is centrally disposed in the mounting nipple 96. The mounting nipple 96 is engageable to the mounting nipple receiving aperture 34. Once the mounting nipple 96 engages the mounting nipple receiving aperture 34, a fastener 87 is engageable to the mounting pin hole to secure the skinner bar 90 to the horizontal shaft 21.

A plurality of spaced apart skinner snatch pins 91 centrally disposed along an entire length of the skinner bar 90 undersurface 94. Each of the skinner snatch pins 91 has a sharp outer tip 87. The sharp outer tip 87 permits puncturing and holding the hide of the animal in a fixed position so that when the animal is being hoisted vertically with the winch 84, the hide will peel away as the animal is raised.

Figure 5:
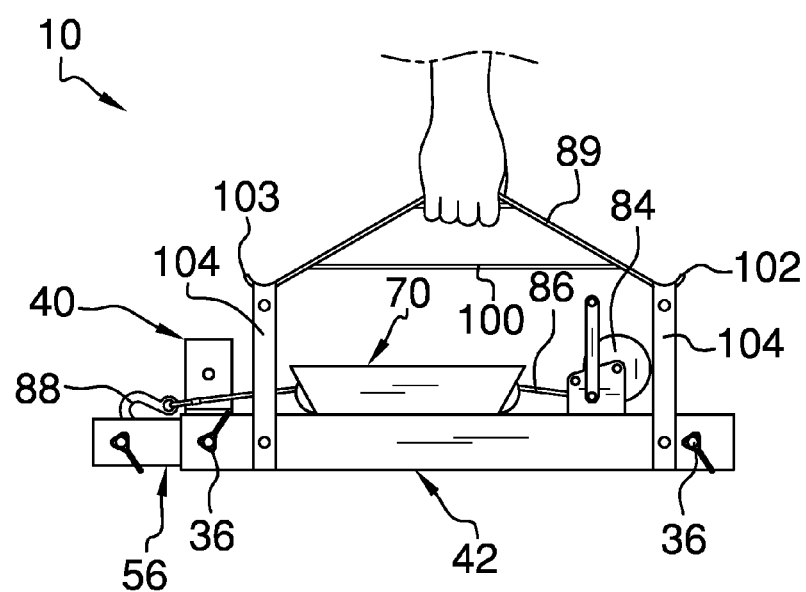
FIG. 5 is a side view in a collapsed condition.

The L-shaped support frame 19, the top pulley unit 70, and the skinner bar 90, collectively, have an extended position, as shown in FIGS. 1 and 2, and an alternate collapsed position, as shown in FIG. 5. A plurality of lock pins 101 is provided to lock the L-shaped frame 19 in the extended position. A first lock pin hole 93 is disposed in the swivel unit 40 proximal the bottom end 41 thereof. A second lock pin hole 95 is disposed in the lower vertical boom shaft 42 proximal the top end 46 thereof. A third lock pin hole 97 is disposed in the upper vertical boom shaft 56 proximal the upper end thereof and through the top pulley unit 70. In the extended position, one of the lock pins 101 engages the first lock pin hole 93 to attach the lower vertical boom shaft 42 to the swivel unit 40 while another of the lock pins 101 engages the second lock pin hole 95 to attach the lower vertical boom shaft 42 to the upper vertical boom shaft 56. Still another of the lock pins 101 engages the third lock pin hole 97 to attach the upper vertical boom shaft 56 to the top pulley unit 70.

Referring now to FIG. 5, the L-shaped frame 19 is shown in the alternate collapsed position. In the collapsed position, the lower vertical boom shaft 42 is detached from the base unit 20, the top pulley unit 70 is detached from the upper vertical boom shaft 56, the skinner bar is detached from the base unit 20, and the upper vertical boom shaft 56 is telescopically disposed within the lower vertical boom shaft 42 and the base unit 20, lower vertical boom shaft 42, upper vertical boom shaft 56 skinner bar 90 and top pulley unit 70. In the collapsed position, the snatch pins 91 of the skinner bar 90 are mated with the skinner bar storage alignment holes 28 disposed on upper wall 26 of base unit 20, the top pulley unit 70 rests on top of the lower boom shaft 42, the upper vertical boom shaft 56 is telescopically disposed within the lower vertical boom shaft 42 and they are pinned together with the base unit 20 in a parallel position utilizing the aligned; storage pin alignment holes 36 with the first lock pin hole 93 and the second lock pin hole 95.

A pair of transport straps 104, shown in FIG. 5, is provided to cradle the device 10 in a collapsed position. The transport straps 104 are securable to the lower vertical boom shaft 42, while the gambrel 89 is utilized as a handle with a curved first end 102 and a curved second end 103 of the gambrel 89 hooked onto a respective one of the transport straps 104, as shown in FIG. 5, to manually carry and store the L-shaped frame 19 in the collapsed position along with the top pulley unit 70 and the skinner bar 90. The curved first and second ends 102, 103 of the gambrel 89 directed upwardly toward an apex 105 of the gambrel.

What is claimed is:

1. A collapsible hitch mounted game hoist apparatus comprising:
    an L-shaped frame comprising:
        a horizontal base unit comprising:
            a hollow horizontal shaft having a front end, a rear end, an upper wall, a lower wall, and a pair of side walls;
            a plurality of centrally aligned skinner bar storage holes continuously disposed along the upper wall of the base unit;
            a swivel unit locking hole centrally disposed in the upper wall of the base unit proximal the rear end;
            a hitch mounting hole is disposed through each of the side walls in a position proximal the front end of the base unit;
            a storage pin alignment hole through each side wall proximal each of the front end and in the rear end of the base unit;
            a mounting nipple receiving aperture centrally disposed on the lower wall of the horizontal shaft proximal the rear end;
        a hollow parallelepiped swivel unit disposed on the rear end on the upper wall of the horizontal shaft in a position perpendicular to the base unit, the swivel unit having a quadrate of walls, an open top end, and a closed bottom end;
        a swivel bolt hole centrally disposed in the bottom end of the swivel unit;
        a hollow parallelepiped lower vertical boom shaft swivelably disposed atop the swivel unit in a position coplanar to the swivel unit, the lower vertical boom shaft having an open top end, an open bottom end, a front wall, a rear wall, a right wall, and a left wall;
        a first lock pin hole disposed in the swivel unit proximal the bottom end of the swivel unit;
        a hollow parallelepiped upper vertical boom shaft telescopically disposed within the lower vertical boom shaft, the upper vertical boom shaft having an open lower end, an open top end, a front wall, a rear wall, a right wall, and a left wall;
        a second lock pin hole disposed in the lower vertical boom shaft proximal the top end thereof;
    a top pulley unit disposed on the upper end of the upper vertical boom shaft in a position perpendicular thereto, the top pulley unit comprising:
        a hollow horizontal arm having a front end, a rear end, an upper wall, a pair of side walls, and an inner wall;
        a pulley disposed on each of the rear end of the horizontal arm and the front end of the horizontal arm;
        wherein each pulley has a pulley axle mounted through each of the side walls of the horizontal arm;
    a third lock pin hole disposed in the upper vertical boom shaft proximal the upper end thereof and through the top pulley unit proximal the front end thereof;
    a winch disposed on the front wall of the lower vertical boom shaft proximal the lower end thereof;
    a cable extending around the winch and upwardly over each of the pulleys, along the lower vertical boom shaft, along the upper vertical boom shaft, and through the top pulley unit and terminating in a hook;
    a substantially triangular gambrel engaging the hook, the gambrel having a pair of parallel cross bars;
    a skinner bar attachable to the horizontal shaft rear end, the skinner bar comprising:
        an upper surface;
        an undersurface;
        a U-shaped stabilizer plate centrally disposed on the upper surface of the skinner bar and directly adjacent to the side walls of the horizontal shaft;
        a mounting nipple centrally disposed on the upper surface of the skinner bar;
        a mounting pin hole centrally disposed in the mounting nipple;
        wherein the mounting nipple is engageable to the mounting nipple receiving aperture;
        wherein the mounting pin hole is engageable by a fastener, wherein the engagement of the fastener to the mounting pin hole secures the skinner bar to the horizontal shaft;

a plurality of spaced apart snatch pins centrally disposed along an entire length of the skinner bar undersurface, each of the snatch pins having a sharp outer tip;

wherein the L-shaped frame, the top pulley unit and the skinner bar collectively have an extended position and an alternate collapsed position;

a plurality of lock pins, one of the lock pins engageable to the first lock pin hole, wherein engagement of one of the lock pins to the first lock pin hole attaches lower vertical boom shaft to the swivel unit, wherein engagement of one of the lock pins to the second lock pin hole attaches the lower vertical boom shaft to the extended upper vertical boom shaft, wherein engagement of one of the lock pins to the third lock pin hole attaches the top end of the upper vertical boom shaft to the front end of the top pulley unit in a plane generally parallel to the plane of the base unit.

2. The collapsible hitch mounted game hoist apparatus of claim 1:

wherein the swivel bolt is configured to permit a 360-degree rotation of the swivel unit; and wherein the engagement of one of the lock pins into the first lock pin hole is configured to secure the swivel unit in one of a 90-degree position, a 180-degree position, a 270-degree position, and a 360-degree position relative the horizontal shaft.

3. A collapsible hitch mounted game hoist apparatus of claim 2 further comprising:

a curved first end and a curved second end of the gambrel, the curved first and second ends of the gambrel directed upwardly toward an apex of the gambrel;

wherein in the collapsed position, the lower vertical boom shaft and the base unit are disposed parallel to each other;

a pair of transport straps securable around the lower vertical boom shaft and the base unit and to the gambrel in the collapsed position;

wherein the curved first end and the curved second end of the gambrel hook are engageable onto a respective one of the transport straps when the L-shaped frame is in the collapsed position.

4. The collapsible hitch mounted game hoist apparatus of claim 3:

wherein in the collapsed position, the lower vertical boom shaft is detached from the base unit, the top pulley unit is detached from the upper vertical boom shaft, the skinner bar is detached from the base unit, the upper vertical boom shaft is telescopically disposed within the lower vertical boom shaft; and wherein in the collapsed position, the snatch pins of the skinner bar engage skinner bar storage alignment holes, the top pulley unit is disposed atop the lower boom shaft.

* * * * *